United States Patent
Yavuz et al.

(10) Patent No.: US 11,432,210 B2
(45) Date of Patent: Aug. 30, 2022

(54) SYSTEMS AND METHODS PROVIDING MOBILITY SUPPORT FOR ENHANCED COVERAGE OF WIRELESS DEVICES

(71) Applicant: TELEFONAKTIEBOLAGET LM ERICSSON (PUBL), Stockholm (SE)

(72) Inventors: Emre Yavuz, Stockholm (SE); Tuomas Tirronen, Helsinki (FI); Andreas Höglund, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/766,134

(22) PCT Filed: Oct. 4, 2016

(86) PCT No.: PCT/IB2016/055933
§ 371 (c)(1),
(2) Date: Apr. 5, 2018

(87) PCT Pub. No.: WO2017/060815
PCT Pub. Date: Apr. 13, 2017

(65) Prior Publication Data
US 2018/0302829 A1 Oct. 18, 2018

Related U.S. Application Data

(60) Provisional application No. 62/237,272, filed on Oct. 5, 2015.

(51) Int. Cl.
*H04W 4/00* (2018.01)
*H04W 36/00* (2009.01)
(Continued)

(52) U.S. Cl.
CPC ....... *H04W 36/0077* (2013.01); *H04W 36/08* (2013.01); *H04W 74/006* (2013.01);
(Continued)

(58) Field of Classification Search
CPC . H04W 36/0077; H04W 36/08; H04W 36/14; H04W 74/006; H04W 74/08; H04L 1/08
See application file for complete search history.

(56) References Cited

U.S. PATENT DOCUMENTS 10,117,152 B2 * 10/2018 Wang ............... H04W 4/70
2007/0047493 A1 * 3/2007 Park ............... H04W 36/0055
370/331

(Continued)

FOREIGN PATENT DOCUMENTS

EP 2869489 A1 * 5/2015 ........ H04W 36/0055
EP 2869489 A1 5/2015
(Continued)

OTHER PUBLICATIONS

MediTek (R1-135424, "discussion on PRACH and RACH procedure in coverage enhancement mode", Nov. 11-15, 2013), second page table 1 also cover the scope of claim 3. (Year: 2013).*
(Continued)

*Primary Examiner* — Maharishi V Khirodhar
(74) *Attorney, Agent, or Firm* — Sage Patent Group

(57) ABSTRACT

According to certain embodiments, a method by a source network node is provided for providing mobility support for enhanced coverage of wireless devices-in handover to a target network node. The method includes obtaining, from the target network node, an indication of at least one resource to be used by the wireless device in handover from the source network node to the target network node. The indication of the at least one resource is transmitted to the wireless device for use in handover from the source network node to the target network node.

20 Claims, 7 Drawing Sheets

(51) Int. Cl.
*H04W 74/00* (2009.01)
*H04W 36/08* (2009.01)
*H04W 74/08* (2009.01)
*H04L 1/08* (2006.01)
*H04W 36/14* (2009.01)

(52) U.S. Cl.
CPC .............. *H04W 74/08* (2013.01); *H04L 1/08* (2013.01); *H04W 36/14* (2013.01); *H04W 74/0833* (2013.01)

(56) References Cited

U.S. PATENT DOCUMENTS

| | | | | |
|---|---|---|---|---|
| 2015/0016312 A1* | 1/2015 | Li | ............ | H04W 74/0833 370/280 |
| 2016/0192376 A1* | 6/2016 | Lee | ............ | H04W 48/20 370/252 |
| 2016/0345119 A1* | 11/2016 | Futaki | ............ | H04W 4/70 |
| 2017/0279646 A1* | 9/2017 | Yi | ............ | H04L 5/0053 |

FOREIGN PATENT DOCUMENTS

| | | |
|---|---|---|
| EP | 3101941 A1 | 12/2016 |
| WO | 2015114695 A1 | 8/2015 |
| WO | 2015116870 A1 | 8/2015 |
| WO | WO-2015116870 A1 * | 8/2015 ........ H04W 36/0069 |

OTHER PUBLICATIONS

Sharp, On PRACH coverage enhancement for MTC UE, 3GPP TSG RAN WG1 Meeting #76, R1-140640, Prague, Czech Republic, Feb. 10-14, 2014.

3GPP TS 36.300 V13.0.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13), Jun. 2015.

3GPP TS 36.331 V12.5.0, 3rd Generation Partnership Project; Technical Specification Group Radio Access Network; Evolved Universal Terrestrial Radio Access (E-UTRA); Radio Resource Control (RRC); Protocol specification (Release 12), Mar. 2015.

Nokia Networks, Connected mobility for Rel13 UEs in EC mode, 3GPP TSG-RAN WG2 Meeting #91, R2-153614, Beijing, China, Aug. 24-28, 2015.

Ericsson, Revised WI: Further LTE Physical Layer Enhancements for MTC, 3GPP TSG RAN Meeting #66, RP-141865, Edinburgh, Scotland, Sep. 9-12, 2014.

* cited by examiner

SYSTEMS AND METHODS PROVIDING MOBILITY SUPPORT FOR ENHANCED COVERAGE OF WIRELESS DEVICES

This application is a 371 of International Application No. PCT/IB2016/055933, filed Oct. 4, 2016, which claims the benefit of U.S. Provisional Application No. 62/237,272, filed Oct. 5, 2015, the disclosures of which are fully incorporated herein by reference.

PRIORITY

This application claims priority to U.S. Patent Provisional Application No. 62/237,272 filed on Oct. 5, 2015, entitled "Mobility Support for UEs in Enhanced Coverage," the disclosure of which is hereby incorporated by reference.

TECHNICAL FIELD

The present disclosure relates, in general, to wireless communications and, more particularly, systems and methods providing mobility support for enhanced coverage of wireless devices in handover from a source network node to a target network node.

BACKGROUND

A goal of Long Term Evolution (LTE) is the development of low complexity user equipment (UE) capable of improved enhanced coverage machine-type communication (MTC) at a cost approaching that of an Enhanced General Packet Radio Service (EGPRS) modem. Specifically, a coverage improvement target of 15-20 dB for both frequency duplex division (FDD) and time duplex division (TDD) in comparison to normal LTE footprint is desired to support the use cases where MTC devices are deployed in challenging locations such as, for example, deep inside buildings, and to compensate for gain loss caused by complexity reduction techniques. More recent objectives include the specification of a new Rel-13 low complexity UE category, LTE coverage improvement corresponding to 15 dB for FDD, and reduced power consumption reduction by the UE. Reduced UE bandwidth of 1.4 MHz in downlink and uplink is considered as the most important complexity reduction technique for Rel-13 low complexity UEs. More generally, the objective is a UE for MTC operation in LTE that also allows for enhanced coverage compared to existing LTE networks and low power consumption.

SUMMARY

To address the foregoing problems with existing solutions, disclosed is systems and methods providing mobility support for enhanced coverage of wireless devices.

According to certain embodiments, a method by a source network node is provided for mobility support for enhanced coverage of a wireless device in handover to a target network node. The method includes obtaining, from the target network node, an indication of at least one resource to be used by the wireless device in handover from the source network node to the target network node. The indication of the at least one resource is transmitted to the wireless device in handover from the source network node to the target network node.

According to certain embodiments, a network node providing mobility support for enhanced coverage of a wireless device in handover to a target network node includes a memory storing instructions. A processor is operable to execute the instructions to cause the processor to obtain, from the target network node, an indication of at least one resource to be used by the wireless device in handover from the source network node to the target network node and transmit, to the wireless device, the indication of the at least one resource to be used by the wireless device in handover from the source network node to the target network node.

According to certain embodiments, a method by a wireless device is provided for receiving mobility support for enhanced coverage during handover from a source network node to a target network node. The method includes receiving, from the source network node, an indication of at least one resource to be used by the wireless device in handover from the source network node to the target network node. A random access message is transmitted to the target network node using the at least one resource.

According to certain embodiments, a wireless device is provided for receiving mobility support for enhanced coverage during handover from a source network node to a target network node. The wireless device includes a memory storing instructions. A processor is operable to execute the instructions to cause the processor to receive, from the source network node, an indication of at least one resource to be used by the wireless device in handover from the source network node to the target network node. The processor transmits a random access message to the target network node using the at least one resource.

Certain embodiments of the present disclosure may provide one or more technical advantages. For example, certain embodiments may prevent handover failure. For example, if the wireless device performs a random access procedure towards a target eNB with allocated Physical Random Access Channel (PRACH) resources but the predicted coverage enhancement level for the wireless device in the target cell is incorrect, the wireless device can adapt and transmit the Random Access (RA) with the appropriate Coverage Enhancement-level (CE-level). As a result, a target eNB may still be able to decode the message and therefore avoid handover failure. Still another advantage may be that the disclosed techniques require less signalling that the techniques that communicate the wireless device-s CE-level via the mobile management entity (MME).

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Particular embodiments of the present disclosure may provide solutions enabling providing mobility support for enhanced coverage of wireless devices. Certain embodiments may include functionality providing mobility support to wireless devices during handover from a source network node to a target network node. Certain other embodiments may include functionality for receiving mobility support from a source network node during handover to a target network node.

Figure 1:
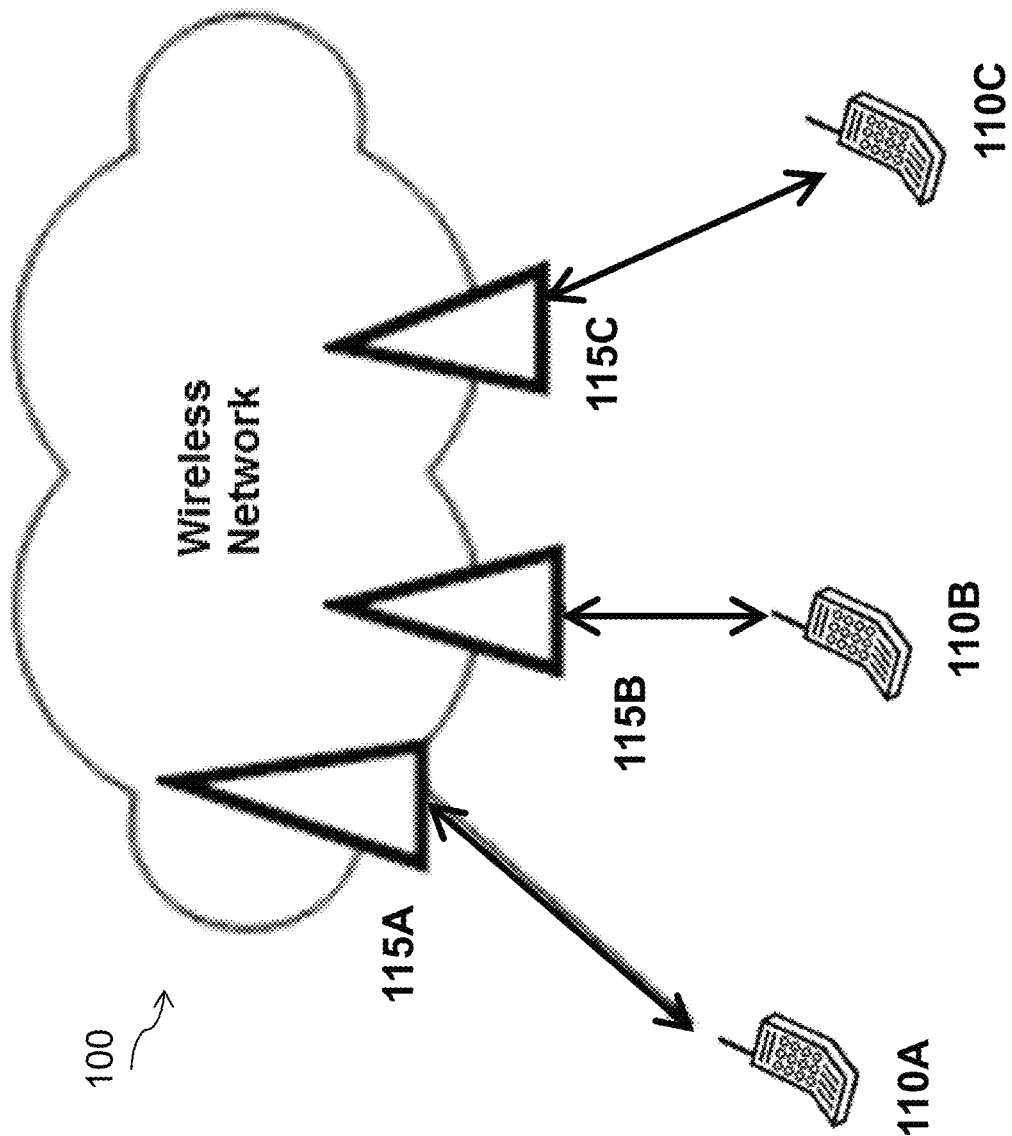
FIG. 1 illustrates an exemplary network providing mobility support for enhanced coverage of wireless devices, in accordance with certain embodiments.

Particular embodiments are described in FIGS. 1-7 of the drawings, like numerals being used for like and corresponding parts of the various drawings. FIG. 1 is a block diagram illustrating an embodiment of a network 100 providing mobility support for enhanced coverage of wireless devices, in accordance with certain embodiments. Network 100 includes one or more wireless devices 110A-C, which may be interchangeably referred to as wireless devices 110 or UEs 110, and network nodes 115A-C, which may be interchangeably referred to as network nodes 115 or eNodeBs 115. A wireless device 110 may communicate with network nodes 115 over a wireless interface. For example, wireless device 110A may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell. In some embodiments, wireless devices 110 may have D2D capability. Thus, wireless devices 110 may be able to receive signals from and/or transmit signals directly to another wireless device 110. For example, wireless device 110A may be able to receive signals from and/or transmit signals to wireless device 110B.

In certain embodiments, network nodes 115 may interface with a radio network controller (not depicted in FIG. 1). The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for wireless devices 110. Wireless devices 110 may exchange certain signals with the core network node using the non-access stratum layer. In non-access stratum signaling, signals between wireless devices 110 and the core network node may be transparently passed through the radio access network. In certain embodiments, network nodes 115 may interface with one or more network nodes over an internode interface. For example, network nodes 115A and 115B may interface over an X2 interface.

As described above, example embodiments of network 100 may include one or more wireless devices 110, and one or more different types of network nodes capable of communicating (directly or indirectly) with wireless devices 110. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Also, in some embodiments, generic terminology, "radio network node" (or simply "network node") is used. It can be any kind of network node, which may comprise a Node B, base station (BS), multi-standard radio (MSR) radio node such as MSR BS, eNode B, network controller, radio network controller (RNC), base station controller (BSC), relay donor node controlling relay, base transceiver station (BTS), access point (AP), transmission points, transmission nodes, RRU, RRH, nodes in distributed antenna system (DAS), core network node (e.g. MSC, MME etc.), O&M, OSS, SON, positioning node (e.g. E-SMLC), MDT, or any suitable network node. Example embodiments of network nodes 115 and wireless devices 110 are described in more detail with respect to FIGS. 2 and 5, respectively.

Although FIG. 1 illustrates a particular arrangement of network 100, the present disclosure contemplates that the various embodiments described herein may be applied to a variety of networks having any suitable configuration. For example, network 100 may include any suitable number of wireless devices 110 and network nodes 115, as well as any additional elements suitable to support communication between wireless devices or between a wireless device and another communication device (such as a landline telephone). Furthermore, although certain embodiments may be described as implemented in a long term evolution (LTE) network, the embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). For example, the various embodiments described herein may be applicable to LTE, LTE-Advanced, LTE-U UMTS, HSPA, GSM, cdma2000, WiMax, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink and vice versa.

The techniques for mobility support for EC enabled wireless devices described herein are applicable to both LAA LTE and standalone LTE operation in license-exempt channels. The described techniques are generally applicable for transmissions from both network nodes 115 and wireless devices 110.

In certain embodiments, wireless devices 110 may include MTC devices that are placed in challenging locations, for which LTE network rollouts were not dimensioned for full coverage. For example, smart meters may be placed in building basements and may even be contained in metal enclosures. Similarly, smart agriculture devices may be located in rural and isolated areas.

One particular type of information that requires reliable transmission in network 100 is handover messages. According to certain embodiments, a network 100, via an evolved Node B (eNB) 115, for example, may provide a set of Physical Random Access Channel (PRACH) resources and repetition factors to wireless device 110. The set of PRACH resources may include time, frequency, preamble, or other factors. The repetitions factors may include a number of repetitions required to transmit the preamble in random access request messages. Each resource is associated with a coverage enhancement (CE) level (including the level that corresponds to low complexity wireless devices 110 in normal coverage). This means separate preamble sub-groups may be configured from the legacy preamble set so that network 100 can identify based on the preamble received from a wireless device 110 whether the wireless device 110 has low complexity or not and which coverage enhancement level the wireless device 110 operates.

In certain example embodiments, it may be difficult to predict whether the CE-level stays the same as wireless device 110 moves into a target cell. In other embodiments, the CE level may change after a source network node 115 may inform a target network node 115 during handover preparation or after the handover command is sent. In such situations, target network node 115 may have no means of being aware of such change. When wireless device 110 performs the random access procedure towards target network node 115 with the allocated PRACH resources (i.e., using the corresponding number of repetitions required for that particular CE level), the target network node 115 may not be able to decode the message if the coverage enhancement level is worse than before. In still other embodiments, target network node 115 may be able to decode the message by accumulating a smaller number of repetitions if coverage enhancement level is better than before.

Figure 2:
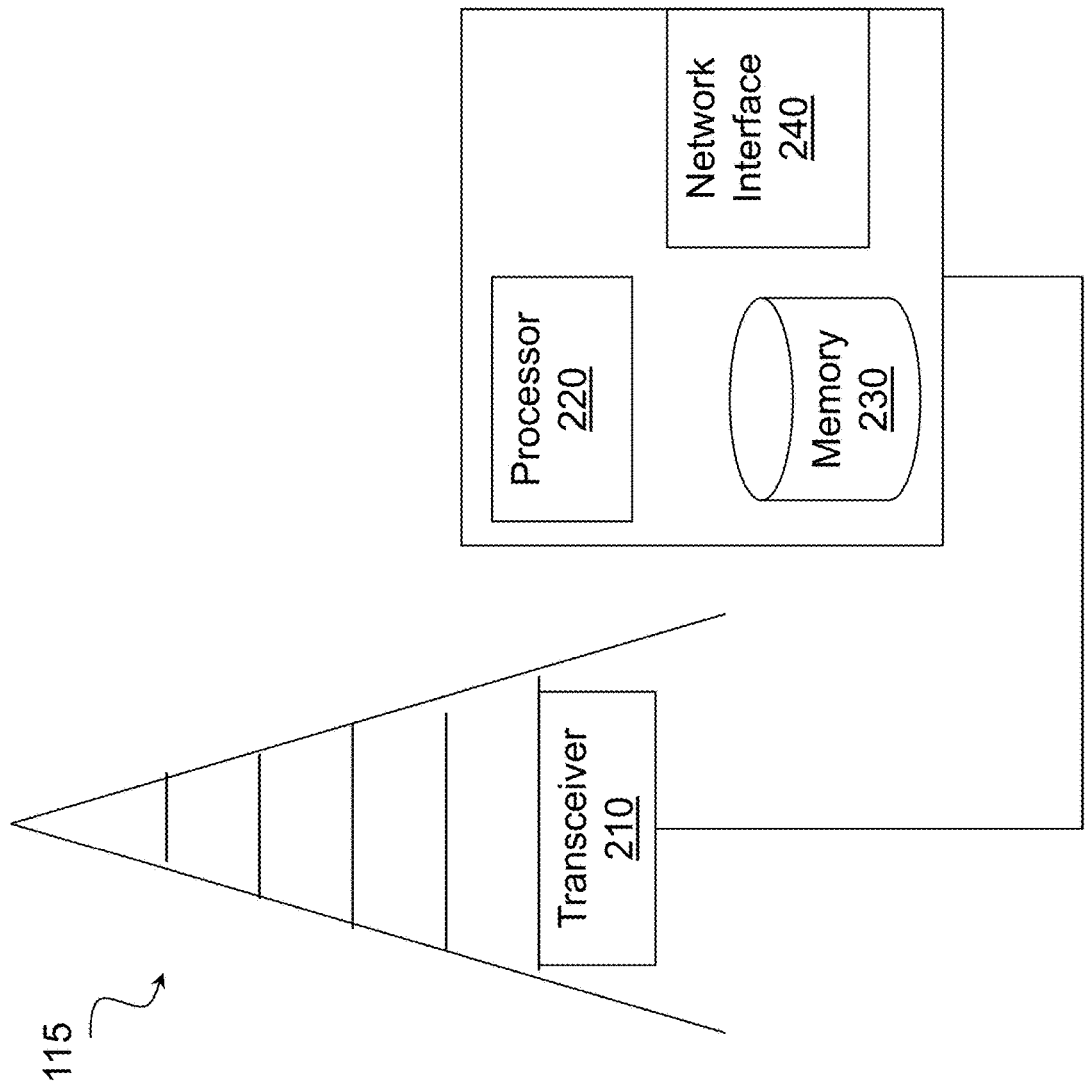
FIG. 2 illustrate an example network node providing mobility support for enhanced coverage of wireless devices, in accordance with certain embodiments.

FIG. 2 illustrate an example network node 115 for providing mobility support for enhanced coverage of wireless devices, according to certain embodiments. As described above, network node 115 may be any type of radio network node or any network node that communicates with a wireless device and/or with another network node. Examples of a network node 115 are provided above.

Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 210, processor 220, memory 230, and network interface 240. In some embodiments, transceiver 210 facilitates transmitting wireless signals to and receiving wireless signals from wireless device 110 (e.g., via an antenna), processor 220 executes instructions to provide some or all of the functionality described above as being provided by a network node 115, memory 230 stores the instructions executed by processor 220, and network interface 240 communicates signals to backend network components, such as a gateway, switch, router, Internet, Public Switched Telephone Network (PSTN), core network nodes or radio network controllers, etc.

In certain embodiments, network node 115 may be capable of using multi-antenna techniques, and may be equipped with multiple antennas and capable of supporting MIMO techniques. The one or more antennas may have controllable polarization. In other words, each element may have two co-located sub elements with different polarizations (e.g., 90 degree separation as in cross-polarization), so that different sets of beamforming weights will give the emitted wave different polarization.

Processor 220 may include any suitable combination of hardware and software implemented in one or more modules to execute instructions and manipulate data to perform some or all of the described functions of network node 115. In some embodiments, processor 220 may include, for example, one or more computers, one or more central processing units (CPUs), one or more microprocessors, one or more applications, and/or other logic.

Memory 230 is generally operable to store instructions, such as a computer program, software, an application including one or more of logic, rules, algorithms, code, tables, etc. and/or other instructions capable of being executed by a processor. Examples of memory 230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information.

In some embodiments, network interface 240 is communicatively coupled to processor 220 and may refer to any suitable device operable to receive input for network node 115, send output from network node 115, perform suitable processing of the input or output or both, communicate to other devices, or any combination of the preceding. Network interface 240 may include appropriate hardware (e.g., port, modem, network interface card, etc.) and software, including protocol conversion and data processing capabilities, to communicate through a network.

Other embodiments of network node 115 may include additional components beyond those shown in FIG. 2 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components. Additionally, the terms first and second are provided for example purposes only and may be interchanged.

During a handover procedure, the handover command may contain PRACH resources for a wireless device 110 moving from a source cell to a target cell. For example, a Radio Resource Control (RRC) Connection Reconfiguration message may include mobility control information and may include PRACH resources such as information that may be used to identify a dedicated preamble to be used, time/frequency information, and/or a number of repetitions required. If wireless device 110 is operating coverage enhancements and/or it is a low complexity wireless device, the allocated PRACH resources may indicate a certain coverage enhancement (CE) level that may be determined based on the measurement reports, if available.

Figure 3:
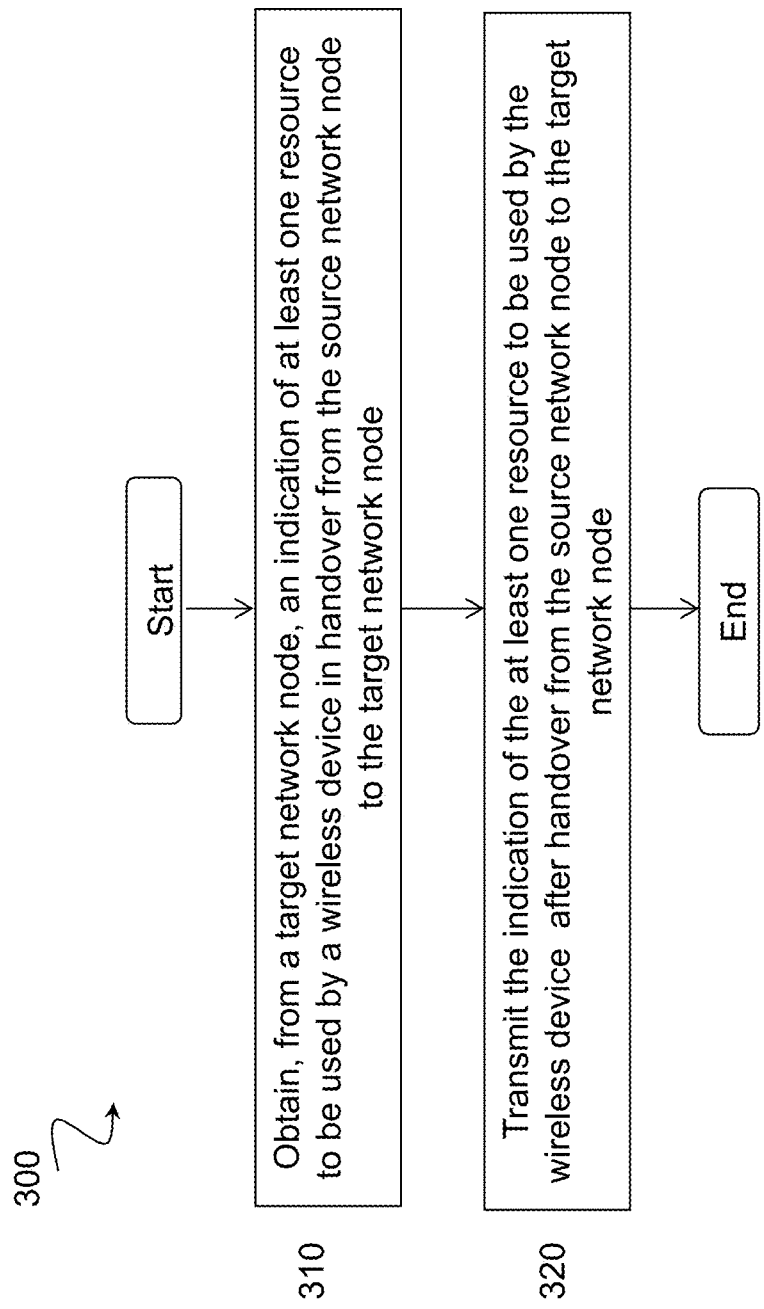
FIG. 3 illustrates an example method by a network node for providing mobility support for enhanced coverage of wireless devices, in accordance with certain embodiments.

FIG. 3 illustrates an example method 300 by a source network node 115 for providing mobility support for enhanced coverage of a wireless device 110 in handover to a target network node 115, according to certain embodiments. The method begins at step 310 when a source network node 115 obtains, from a target network node 115, an indication of at least one resource to be used by wireless device 110 in handover from the source network node 115 to the target network node 115. For example, if a handover command includes dedicated PRACH resources allocated by the target network node, source network node 115 may obtain these dedicated resources from the target network node 115.

At step 320, source network node 115 transmits the indication of the at least one resource to the wireless device 110 so that indicated resources may be used by the wireless device 110 during handover from the source network node 115 to the target network node 115. In particular embodiments, the indication may be transmitted to wireless device 110 using RRC Connection Reconfiguration message. For example, the indication of resources may be included in the mobility control information element, in the RACHConfigDedicated information element where the RACH-ConfigDedication information element is modified or extended to include the resource information. Alternatively, a new information element may be used to transmit the resource information.

In certain embodiments, the at least one resource identified by the indication may include a number of repetitions to be used by wireless device 110 when transmitting a random access request message. Where source network node 115 transmits the information to wireless device 110, wireless device 110 then knows the number of repetitions that should be transmitted to access the target network node 115. Additionally or alternatively, the indication may include a preamble to be used to transmit a random access message by wireless device 110.

In certain embodiments, the at least one resource may include resource information for one or more coverage enhancement levels. For example, the resource information may include information for a coverage enhancement level that is currently associated with wireless device 110. As another example the resource information may include information for each all coverage enhancement levels in case the operating coverage enhancement level of wireless device 110 changes during handover. In one example scenario, different preambles may be provided to wireless device 110 while wireless device is out-of-sync. The wireless device 110 may re-obtain uplink synchronization via random access at the appropriate coverage enhancement level when handover is desired.

In still other embodiments, only that information which relates to coverage enhancement levels that are equal to or worse than the coverage enhancement level associated with the wireless device may be transmitted. If the coverage enhancement level of wireless device 110 changes to a worse coverage enhancement level, wireless device 110 may alter the resources used to transmit the preamble so that the target network node 115 is able to decode the preambles despite the degraded coverage enhancement level. Conversely, if the coverage enhancement level of wireless device 110 changes to a better coverage enhancement level, wireless device 110 may not alter operations and target network node 115 may be able to decode the preambles at a quicker rate. Still another approach would be to communicate the wireless device's coverage enhancement level via the MME, but such an approach may generate unnecessary signalling over the S1 interface.

In certain embodiments, when obtaining the at least one resource, source or target network node 115 may partition preambles into a groups. Each group may be associated with or assigned to a particular coverage enhancement level. Source network node 115 may then select, as the at least one resource, a preamble from a particular group that is associated with the coverage enhancement level of the wireless device. For example, where the coverage enhancement levels are provided and the wireless device 110 is associated with a particular coverage enhancement level, source network node 115 may select a preamble from the group of preambles associated with the particular coverage enhancement level and send the information that may be used to identify the selected preamble to wireless device 110. Alternatively, source network node 115 may send information identifying all preambles assigned to the particular coverage enhancement level to wireless device 110.

In a particular embodiment, for example, the preambles may be partitioned per coverage enhancement level into groups and the broadcasted system information may include the number of repetitions used for each coverage enhancement level and/or resource set. Wireless device 110 may have this information already. As such the indication provided by source network node 115 may be used to identify one preamble from each of the groups to wireless device 110 in the handover command. In this scenario, wireless device 110 may change the preamble it uses for random access to target network node 116 based on the determined coverage level. Alternatively, if the different coverage enhancement groups are assigned just one preamble each, source network node 115 need only indicate the repetition numbers without the dedicated preambles in the handover command. In such a scenario, wireless device 110 may select a group (and preamble) based on the repetition number provided by source network node 115.

In certain other embodiments, source or target network node 115 may assign a particular preamble to each group such that one preamble is associated with each group. Where the resource identifies a number of repetitions to be used in transmitting a preamble, source network node 115 may then transmit, at step 304, a number of repetitions to be used in transmitting a preamble from a particular group that is associated with the coverage enhancement level of the wireless device.

In particular embodiments, source network node 115 may provide one or more preambles from preamble groups for Contention Free Random Access (CFRA). In other particular embodiments, for example, source network node 115 may provide one or more preambles from one of the preamble groups for Contention Based Resource Access (CBRA) based on coverage enhancement level. More specifically, the network node 115 may assign a preamble from a set partitioned based on coverage enhancement level or a preamble from a contention free set with a certain number of repetitions such that the wireless device 110 may trigger the procedure to access the target cell after the handover.

Since coverage enhancement levels are not the same in all cells, it may be difficult to pass on information about the wireless device's coverage enhancement level from the source network node 115 to the target network node 115. In certain embodiments, a mapping between the coverage enhancement level of target cell and the coverage enhancement level of the source cell may be established and used for such communication. For example, the mapping may be based on statistics of previous successful handovers and rand access attempts. Thus, in certain embodiments, the at least one resource that is provided by source network node 115 to wireless device 110 may be determined based on historical information related to handovers performed from a particular source network node to a particular target network node. For example, the at least one resource may include an estimated coverage enhancement level for the wireless device that is predicted based on previous handovers and the coverage enhancement level of the source network node 115 and the received signal strength, as measured by Reference Signal Received Poser (RSRP) or another similar measurement, of the target cell in the source cell.

Figure 4:
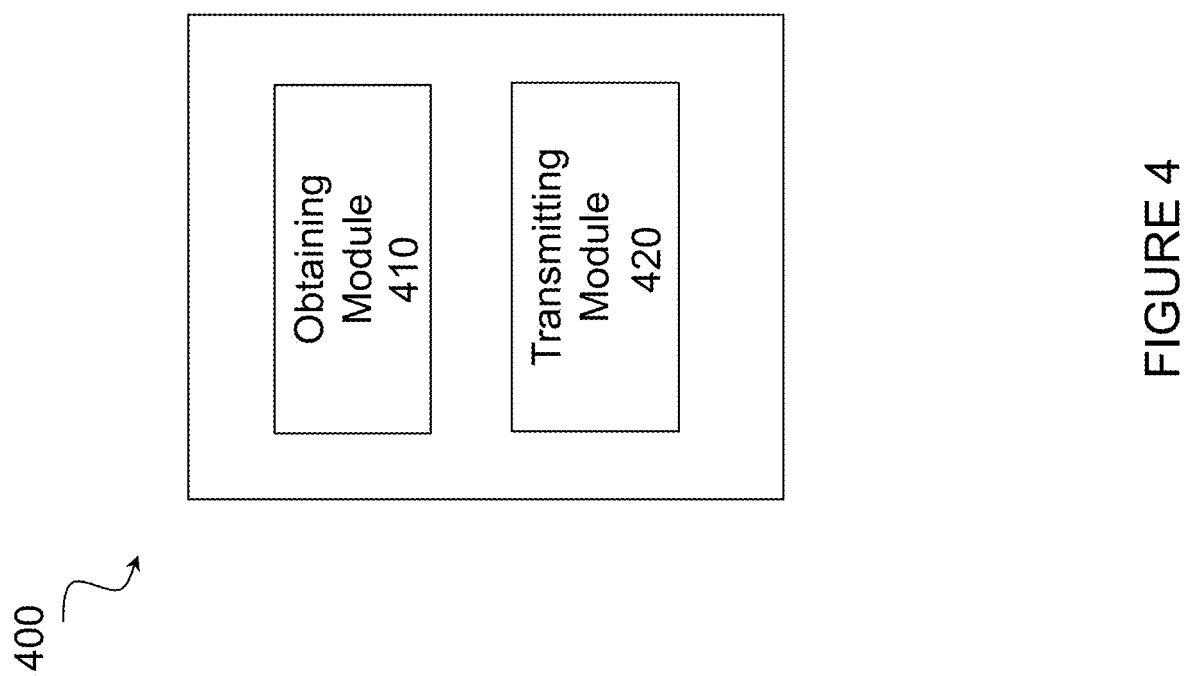
FIG. 4 illustrates virtual computing device for providing mobility support for enhanced coverage of wireless devices, in accordance with certain embodiments.

In certain embodiments, the method for providing mobility support for enhanced coverage of a wireless device 110 in handover to a target network node 115 as described above may be performed by a virtual computing device. FIG. 4 illustrates an example computer networking virtual apparatus 400 for providing mobility support for enhanced coverage of a wireless device 110 in handover to a target network node 115, according to certain embodiments. In certain embodiments, virtual computing device 400 may include modules for performing steps similar to those described above with regard to the method illustrated and described in FIG. 3. For example, virtual computing device 400 may include at least one obtaining module 410, a transmitting module 420, and any other suitable modules for providing mobility support for enhanced coverage of a wireless device 110 in handover to a target network node 115. In some embodiments, one or more of the modules may be implemented using one or more processors 220 of FIG. 2. In certain embodiments, the functions of two or more of the various modules may be combined into a single module.

The obtaining module 410 may perform the obtaining functions of virtual computing device 400. For example, in a particular embodiment, obtaining module 410 obtains, from a target network node 115, an indication of at least one resource to be used by wireless device 110 in handover from the source network node 115 to the target network node 115. As described above, for example, the at least one resource identified by the indication may include a number of repetitions to be used by wireless device 110 when transmitting a random access message requesting access to the network 100. Additionally or alternatively, the indication may include a preamble to be used to transmit a random access message by wireless device 110.

The transmitting module 420 may perform the transmitting functions of virtual computing device 400. For example, in a particular embodiment, transmitting module 420 may transmit the indication of the at least one resource to the wireless device 110 so that indicated resources may be used by the wireless device 110 during handover from the source network node 115 to the target network node 115.

Other embodiments of virtual computing device 400 may include additional components beyond those shown in FIG. 4 that may be responsible for providing certain aspects of the network node's 115 functionality, including any of the functionality described above and/or any additional functionality (including any functionality necessary to support the solutions described above). The various different types of wireless devices 115 may include components having the same physical hardware but configured (e.g., via programming) to support different radio access technologies, or may represent partly or entirely different physical components.

Figure 5:
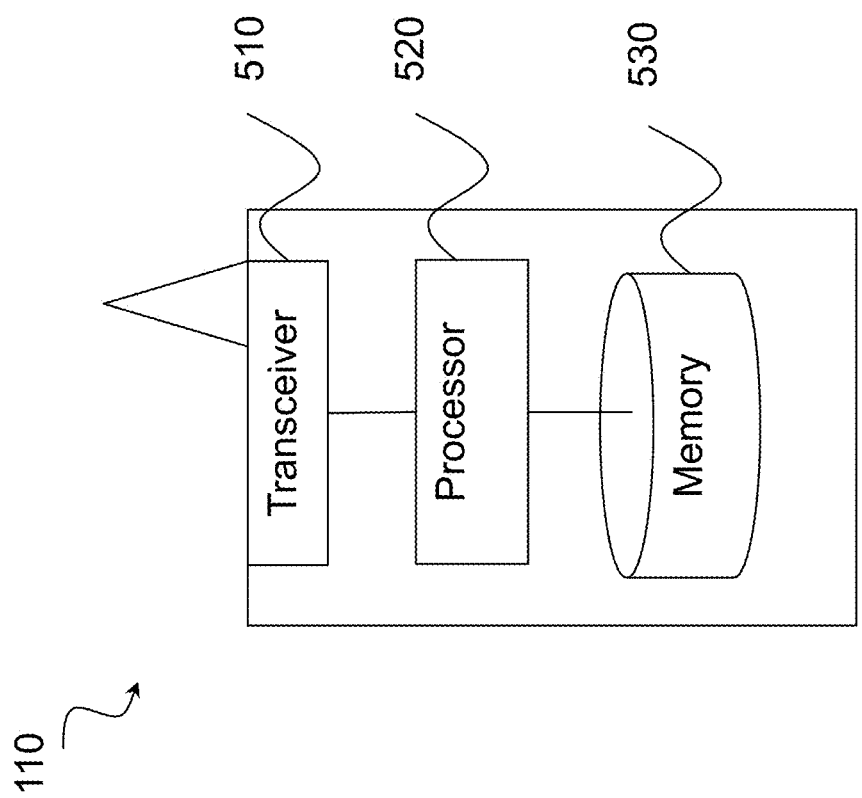
FIG. 5 illustrates an exemplary wireless device for receiving mobility support for enhanced coverage, in accordance with certain embodiments.

FIG. 5 illustrates an example wireless device 110 for receiving mobility support for enhanced coverage, in accordance with certain embodiments. As depicted, wireless device 110 includes transceiver 510, processor 520, and memory 530. In some embodiments, transceiver 510 facilitates transmitting wireless signals to and receiving wireless signals from network node 115 (e.g., via an antenna), processor 520 executes instructions to provide some or all of the functionality described above as being provided by wireless device 110, and memory 530 stores the instructions executed by processor 520. Examples of a wireless device 110 are provided above.

Processor 520 may include any suitable combination of hardware and software implemented in one or more modules to execute instructions and manipulate data to perform some or all of the described functions of wireless device 110. In some embodiments, processor 520 may include, for example, one or more computers, one or more central processing units (CPUs), one or more microprocessors, one or more applications, and/or other logic.

Memory 530 is generally operable to store instructions, such as a computer program, software, an application including one or more of logic, rules, algorithms, code, tables, etc. and/or other instructions capable of being executed by a processor. Examples of memory 530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110 may include additional components beyond those shown in FIG. 5 that may be responsible for providing certain aspects of the wireless device's functionality, including any of the functionality described above and/or any additional functionality (including any functionality necessary to support the solution described above).

Figure 6:
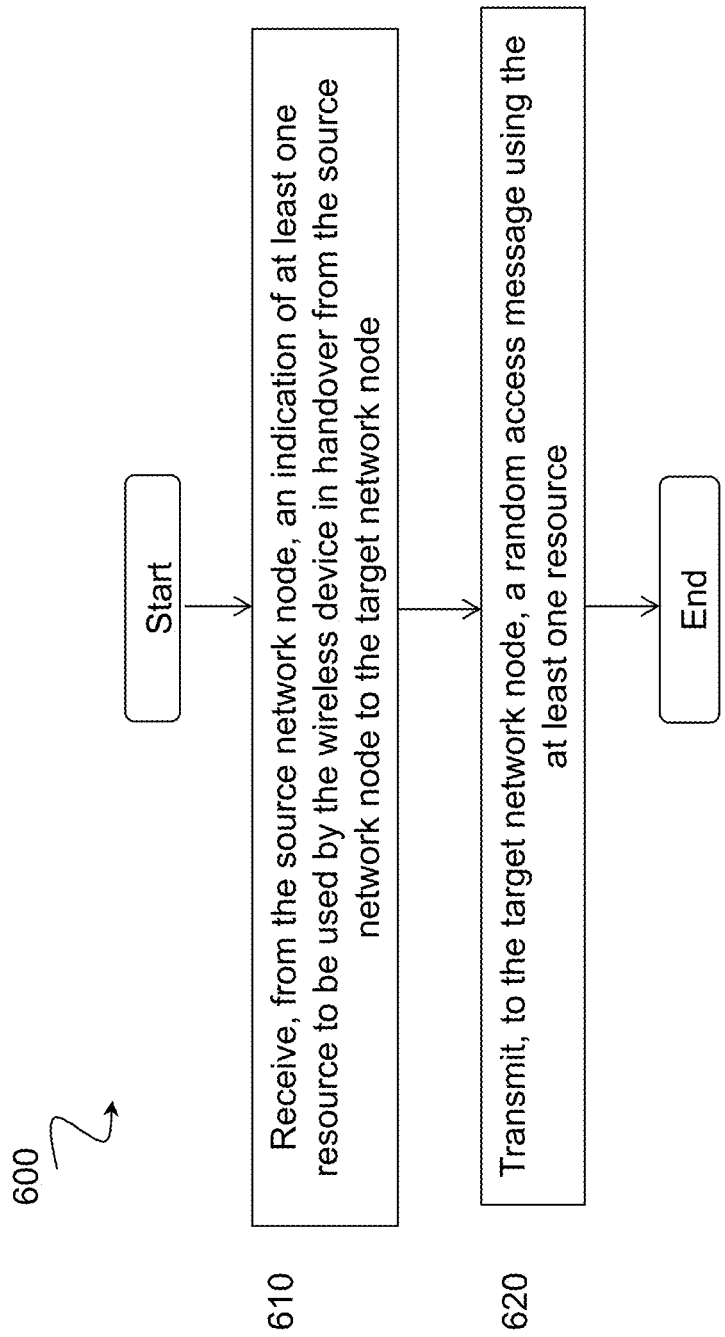
FIG. 6 illustrates an exemplary method by a wireless device for receiving mobility support for enhanced coverage, in accordance with certain embodiments.

FIG. 6 illustrates an exemplary method 600 by a wireless device 110 for receiving mobility support for enhanced coverage, in accordance with certain embodiments. The method begins at step 610 when wireless device 110 receives, from source network node 115, an indication of at least one resource to be used by wireless device 110 in handover from source network node 115 to a target network node 115.

As described above, in certain embodiments, the at least one resource may include resource information that includes a number of repetitions to be used for transmitting a random access message by wireless device 110. Additionally or alternatively, the resource information may include information that enables wireless device to identify a preamble to be used in transmitting the random access message.

As also described above, the at least one resource may include resource information for each of a plurality of coverage enhancement levels. Alternatively, in particular embodiments, wireless device 110 may transmit an indication of a coverage enhancement level associated with wireless device 110 to the source network node. In such a scenario, the step of receiving the indication may include receiving resource information for the coverage enhancement level associated with the wireless device. Alternatively, wireless device 110 may only receive resource information for coverage enhancement levels that are equal to or worse than the coverage enhancement level associated with the wireless device.

At step 620, wireless device 110 transmits, to target network node 115, the random 15 access message using the at least one resource received in the indication from source network node 115.

Figure 7:
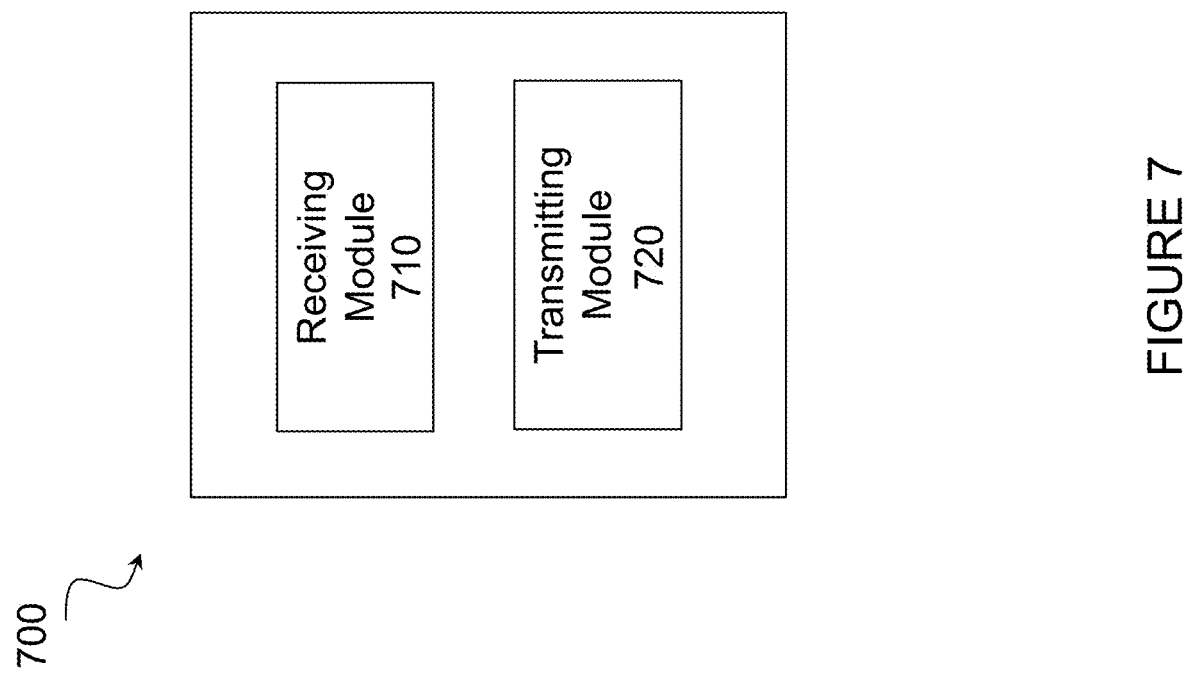
FIG. 7 illustrates virtual computing device for receiving mobility support for enhanced coverage, in accordance with certain embodiments.

In certain embodiments, the method for receiving mobility support for enhanced coverage as described above may be performed by a virtual computing device. FIG. 7 illustrates an example virtual computing device 700 for receiving mobility support for enhanced coverage, according to certain embodiments. In certain embodiments, virtual computing device 700 may include modules for performing steps similar to those described above with regard to the method illustrated and described in FIG. 6. For example, virtual computing device 700 may include at least one receiving module 710, a transmitting module 720, and any other suitable modules for receiving mobility support for enhanced coverage. In some embodiments, one or more of the modules may be implemented using one or more processors 520 of FIG. 5. In certain embodiments, the functions of two or more of the various modules may be combined into a single module.

The receiving module 710 may perform the receiving functions of virtual computing device 700. For example, in a particular embodiment, receiving module 710 may receives, from source network node 115, an indication of at least one resource to be used by wireless device 110 in handover from source network node 115 to a target network node 115. As described above, in certain embodiments, the at least one resource may include resource information that includes a number of repetitions to be used for transmitting a request message by wireless device 110. Additionally or alternatively, the resource information may include information used to identify a preamble to be used in transmitting the random access message by wireless device 110.

The transmitting module 720 may perform the transmitting functions of virtual computing device 700. For example, in a particular embodiment, transmitting module 720 may transmit the random access message to target network node 115 using the at least one resource received in the indication from source network node 115.

Other embodiments of virtual computing device 700 may include additional components beyond those shown in FIG. 7 that may be responsible for providing certain aspects of the wireless device's 110 functionality, including any of the functionality described above and/or any additional functionality (including any functionality necessary to support the solutions described above). The various different types of wireless devices 110 may include components having the same physical hardware but configured (e.g., via programming) to support different radio access technologies, or may represent partly or entirely different physical components.

According to certain embodiments, a method by a source network node is provided for mobility support for enhanced coverage of a wireless device in handover to a target network node. The method includes obtaining, from the target network node, an indication of at least one resource to be used by the wireless device in handover from the source network node to the target network node. The indication of the at least one resource is transmitted to the wireless device in handover from the source network node to the target network node.

According to certain embodiments, a network node providing mobility support for enhanced coverage of a wireless device in handover to a target network node includes a memory storing instructions. A processor is operable to execute the instructions to cause the processor to obtain, from the target network node, an indication of at least one resource to be used by the wireless device in handover from the source network node to the target network node and transmit, to the wireless device, the indication of the at least one resource to be used by the wireless device in handover from the source network node to the target network node.

According to certain embodiments, a method by a wireless device is provided for receiving mobility support for enhanced coverage during handover from a source network node to a target network node. The method includes receiving, from the source network node, an indication of at least one resource to be used by the wireless device in handover from the source network node to the target network node. A random access message is transmitted to the target network node using the at least one resource.

According to certain embodiments, a wireless device is provided for receiving mobility support for enhanced coverage during handover from a source network node to a target network node. The wireless device includes a memory storing instructions. A processor is operable to execute the instructions to cause the processor to receive, from the source network node, an indication of at least one resource to be used by the wireless device in handover from the source network node to the target network node. The processor transmits a random access message to the target network node using the at least one resource.

Certain embodiments of the present disclosure may provide one or more technical advantages. For example, certain embodiments may prevent handover failure. For example, if the wireless device performs a random access procedure towards a target eNB with allocated Physical Random Access Channel (PRACH) resources but the predicted coverage enhancement level for the wireless device in the target cell is incorrect, the wireless device can adapt and transmit the Random Access (RA) with the appropriate Coverage Enhancement-level (CE-level). As a result, a target eNB may still be able to decode the message and therefore avoid handover failure. Still another advantage may be that the disclosed techniques require less signalling that the techniques that communicate the wireless device-s CE-level via the mobile management entity (MME).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A method by a source network node for providing mobility support for enhanced coverage of a wireless device in handover to a target network node, the method comprising:
   obtaining, from the target network node, an indication of at least one resource to be used by the wireless device in handover from the source network node to the target network node;
   receiving, from the wireless device, an indication of a coverage enhancement level associated with the wireless device; and
   transmitting, to the wireless device, the indication of the at least one resource to be used by the wireless device in handover from the source network node to the target network node,
   wherein the indication transmitted by the source network node comprises an indication of resource information for each of only a plurality of coverage enhancement levels that are equal to or worse than the coverage enhancement level associated with the wireless device.

2. The method of claim 1, wherein the at least one resource comprises resource information selected from the group consisting of:
   a number of repetitions to be used for a transmission of a random access message by the wireless device; and
   information enabling the wireless device to select a preamble to be used for the transmission of the random access request by the wireless device.

3. The method of claim 1, wherein the indication of at least one resource comprises resource information for each of a plurality of coverage enhancement levels.

4. The method of claim 1, wherein obtaining the at least one resource comprises:
   partitioning a plurality of preambles into a plurality of groups, each of the plurality of groups being associated with a particular one of a plurality of coverage enhancement levels, and
   selecting, as the at least one resource, a preamble from a particular one of the plurality of groups being associated with the coverage enhancement level associated with the wireless device, and
   wherein transmitting the indication of the at least one resource comprises transmitting information enabling the wireless device to select a preamble from the particular one of the plurality of groups being associated with the coverage enhancement level associated with the wireless device.

5. The method of claim 1, comprising:
   partitioning a plurality of preambles into a plurality of groups, wherein one preamble is associated with each of the plurality of groups, and
   wherein transmitting the indication of the at least one resource comprises transmitting a number of repetitions to be used in transmitting a preamble from a particular group being associated with the coverage enhancement level associated with the wireless device.

6. The method of claim 1, further comprising:
   determining, based on historical information related to handovers performed from the source network node to the target network node, an estimated coverage enhancement level for the wireless device; and
   obtaining the indication of the at least one resource based on the estimated coverage enhancement level for the wireless device.

7. A source network node for providing mobility support for enhanced coverage of a wireless device in handover to a target network node, the source network node comprising:
   a memory storing instructions; and
   a processor operable to execute the instructions to cause the processor to:
      obtain, from the target network node, an indication of at least one resource to be used by the wireless device in handover from the source network node to the target network node;
      receive, from the wireless device, an indication of a coverage enhancement level associated with the wireless device; and
      transmit, to the wireless device, the indication of the at least one resource to be used by the wireless device in handover from the source network node to the target network node,
      wherein the indication transmitted by the source network node comprises an indication of resource information for each of only a plurality of coverage enhancement levels that are equal to or worse than the coverage enhancement level associated with the wireless device.

8. The source network node of claim 7, wherein the at least one resource comprises resource information selected from the group consisting of:
   a number of repetitions to be used for a transmission of a random access message by the wireless device; and
   information enabling the wireless device to select a preamble to be used for the transmission of the random access request by the wireless device.

9. The source network node of claim 7, wherein the at least one resource comprises resource information for each of a plurality of coverage enhancement levels.

10. The source network node of claim 7, wherein:
    when obtaining the at least one resource, the processor is operable to:
       partition a plurality of preambles into a plurality of groups, each of the plurality of groups being associated with a particular one of a plurality of coverage enhancement levels, and
       select, as the at least one resource, a preamble from a particular one of the plurality of groups being associated with the coverage enhancement level associated with the wireless device, and
    when transmitting the indication of the at least one resource, the processor is operable to transmit information enabling the wireless device to select a preamble from the particular one of the plurality of groups being associated with the coverage enhancement level associated with the wireless device.

11. The source network node of claim 7, wherein:
    when obtaining the indication of the at least one resource, the processor is operable to partition a plurality of preambles into a plurality of groups, wherein one preamble is associated with each of the plurality of groups, and
    when transmitting the at least one resource, the processor is operable to transmit a number of repetitions to be used in transmitting a preamble from a particular group being associated with the coverage enhancement level associated with the wireless device.

12. The source network node of claim 7, wherein the processor is further operable to execute the instructions to cause the processor to:
- determine, based on historical information related to handovers performed from the source network node to the target network node, an estimated coverage enhancement level for the wireless device; and
- obtain the indication of the at least one resource based on the estimated coverage enhancement level for the wireless device.

13. A method by a wireless device receiving mobility support for enhanced coverage during handover from a source network node to a target network node, the method comprising:
- receiving, from the source network node, an indication of at least one resource to be used by the wireless device in handover from the source network node to the target network node;
- transmitting, to the source network node, an indication of a coverage enhancement level associated with the wireless device; and
- transmitting, to the target network node, a random access message using the at least one resource,
- wherein receiving the indication of the at least one resource comprises receiving resource information for each of a plurality of coverage enhancement levels that are equal to or worse than the coverage enhancement level associated with the wireless device.

14. The method of claim 3, wherein the indication of the at least one resource comprises resource information selected from the group consisting of:
- a number of repetitions to be used to transmit the random access message by the wireless device; and
- information enabling the wireless device to select a preamble to be used to transmit the random access message by the wireless device.

15. The method of claim 13, wherein the at least one resource comprises resource information for each of a plurality of coverage enhancement levels.

16. The method of claim 13, further comprising transmitting, to the source network node, an indication of a coverage enhancement level associated with the wireless device, and wherein receiving the indication of the at least one resource comprises receiving resource information for the coverage enhancement level associated with the wireless device.

17. A wireless device for receiving mobility support for enhanced coverage during handover from a source network node to a target network node, the wireless device comprising:
- a memory storing instructions; and
- a processor operable to execute the instructions to cause the processor to:
  - receive, from the source network node, an indication of at least one resource to be used by the wireless device in handover from the source network node to the target network node;
  - transmit, to the source network node, an indication of a coverage enhancement level associated with the wireless device; and
  - transmit, to the target network node, a random access message using the at least one resource,
  - wherein receiving the indication of the at least one resource comprises receiving resource information for each of a plurality of coverage enhancement levels that are equal to or worse than the coverage enhancement level associated with the wireless device.

18. The wireless device of claim 17, wherein the at least one resource comprises resource information selected from the group consisting of:
- a number of repetitions to be used to transmit the random access message by the wireless device; and
- information enabling the wireless device to select a preamble to be used to transmit the random access message by the wireless device.

19. The wireless device of claim 17, wherein the indication of the at least one resource comprises resource information for each of a plurality of coverage enhancement levels.

20. The wireless device of claim 17, wherein the processor is further operable to execute the instructions to cause the processor to transmit, to the source network node, an indication of a coverage enhancement level associated with the wireless device, and wherein when receiving the indication of the at least one resource, the processor receives resource information for the coverage enhancement level associated with the wireless device.

* * * * *